United States Patent [19]

Brander

[11] Patent Number: 5,853,568
[45] Date of Patent: Dec. 29, 1998

[54] FLUID CAT CRACKING HEAVY USING STRIPPED CATALYST FOR FEED PREHEAT AND REGENERATOR TEMPERATURE CONTROL

[75] Inventor: John F. R. Brander, Tadworth, England

[73] Assignee: Exxon Research and Engineering Company, Florham Park, N.J.

[21] Appl. No.: 903,425

[22] Filed: Jul. 30, 1997

[51] Int. Cl.[6] .............................. C10G 11/00; C10G 35/10
[52] U.S. Cl. ........................ 208/160; 208/113; 208/150; 208/153; 208/159
[58] Field of Search .................................. 208/160, 150, 208/153, 154, 113

[56] References Cited

U.S. PATENT DOCUMENTS

| | | | |
|---|---|---|---|
| 4,820,404 | 4/1989 | Owen | 208/160 |
| 4,913,801 | 4/1990 | Forester | 208/121 |
| 4,917,790 | 4/1990 | Owen | 208/160 |
| 4,960,503 | 10/1990 | Haun et al. | 208/160 |
| 4,968,401 | 11/1990 | Harandi et al. | 208/160 |
| 5,059,305 | 10/1991 | Supre | 208/160 |
| 5,062,945 | 11/1991 | Pappal et al. | 208/160 |
| 5,160,426 | 11/1992 | Avidan | 208/160 |
| 5,176,819 | 1/1993 | Green | 208/160 |
| 5,389,231 | 2/1995 | Brander et al. | 208/160 |
| 5,409,872 | 4/1995 | Raterman | 502/44 |
| 5,552,033 | 9/1996 | Shih | 208/160 |

FOREIGN PATENT DOCUMENTS

| | | | |
|---|---|---|---|
| 2 100 747 | 1/1983 | United Kingdom | C10G 11/18 |

*Primary Examiner*—Helane Myers
*Attorney, Agent, or Firm*—James H. Takemoto

[57] ABSTRACT

A fluid cat cracking process for catalytically cracking a feed containing vanadium into lower boiling products, includes a cat cracker and a regenerator, with the feed entering the catalytic cracking zone preheated by indirect heat exchange with spent, stripped catalyst particles being recycled from the cracking reactor to the regenerator. Operating the regenerator at a temperature no higher than about 1150° F. permits the amount of vanadium in the feed to be substantially increased with no loss of catalytic activity due to vanadium poisoning of the catalyst, when compared to a higher regenerator temperature of 1365° F. Using the stripped, spent catalyst for heating the feed reduces feed coking and heat exchanger fouling, compared to using the hotter regenerated catalyst for feed preheat.

11 Claims, 2 Drawing Sheets

FLUID CAT CRACKING HEAVY USING STRIPPED CATALYST FOR FEED PREHEAT AND REGENERATOR TEMPERATURE CONTROL

BACKGROUND OF THE INVENTION

Field of the Invention

The invention relates to fluid cat cracking a heavy feed in which the temperature in the regenerator and the temperature difference between the feed and cracking catalyst are reduced by using stripped catalyst for feed preheat. More particularly, the invention relates to reducing the temperature in the catalyst regenerator and preheating the feed to obtain more uniform cracking with less coke make, by preheating the feed in indirect heat exchange with the spent, stripped cracking catalyst before it contacts the hot, regenerated catalyst. This permits the use of feeds with higher metals content without a loss of catalyst activity. One or two stages of regeneration are employed to further reduce poisoning and deactivation of the catalyst in the regenerator.

BACKGROUND OF THE DISCLOSURE

Catalytic cracking, or cat cracking as it is commonly referred to, is an established and widely used process in the petroleum refining industry for converting petroleum oils of relatively high boiling point to more valuable lower boiling products, including gasoline and middle distillates such as kerosene, jet fuel and heating oil. The preeminent catalytic cracking process now in use is the fluid catalytic cracking (FCC) process in which a preheated feed is brought into contact with a hot cracking catalyst which is in the form of a fluidized, fine powder. Typical cracking catalysts are based on zeolites, especially the large pore synthetic faujasites, zeolites X and Y. During the cracking, coke and hydrocarbonaceous material are deposited on the catalyst particles. This results in a loss of catalyst activity and selectivity. The coked catalyst particles and associated hydrocarbonaceous material are subjected to a stripping process, usually with steam, to remove as much of the hydrocarbonaceous material as is technically and economically feasible. The stripped catalyst particles, containing non-strippable coke, are removed from the stripper and sent to a regenerator where they are regenerated by contact with an oxygen-containing gas, typically air or a mixture of air and oxygen, at elevated temperature. This results in the combustion of the coke, which is a strongly exothermic reaction and which, besides removing the coke, serves to heat the catalyst to the temperatures appropriate for the endothermic cracking reaction. The process is carried out in an integrated unit which comprises cracking, stripping and regenerating zones, and associated ancillary equipment. Typically the cracking and stripping zones are associated with a single vessel or unit, with the regenerator being a separate unit. The catalyst is continuously circulated from the reactor or reaction zone, to the stripper, out into the regenerator and back into the reactor. The catalyst circulation rate is typically adjusted relative to the feed rate of the oil, to maintain a heat balanced operation in which the heat produced in the regenerator is sufficient for maintaining the cracking reaction.

The most common feed stocks used with FCC processes are gas oils which are high boiling, non-residual oils and include straight run (atmospheric) gas oil, vacuum gas oil, and coker gas oils. These feeds normally contain minor amounts of vanadium metal which slowly poisons and deactivates the zeolite portion of the cracking catalyst. There is a strong incentive for blending residual feed stocks resids) with heavy gas oils to convert them into lower boiling liquid products. However, resids and other natural and synthetic feeds which contain asphaltenes and other heteroatom and metals containing materials can contain orders of magnitude higher levels of catalyst deactivating metals, such as vanadium and nickel, than lighter, asphaltene free distillate feeds. As is known to those skilled in the art and disclosed, for example, in U.S. Pat. No. 4,913,801, vanadium accumulation on the cracking catalyst reduces its useful life. Nickel accumulation also reduces catalyst activity.

The regenerator or regenerating zone runs hotter than the cracker, typically from about 1150°–1650° F., to burn off the coke deposited on the catalyst particles in the cracking zone. If the regenerator gets too hot the catalyst particles will sinter which destroys the catalyst. To prevent this from happening, particularly when the FCC unit is run with heavy feeds, various means for cooling the regenerators have been used. Some employ water as a cooling medium. In this case, the heat removed by the water is lost to the cat cracking-regenerating unit. Examples of this include U.S. Pat. No. 5,409,872 which discloses controlling the regenerator temperature by circulating the catalyst particles between the regenerator and an external heat exchanger using water as the cooling medium. In U.S. Pat. No. 4,820,404 stripped catalyst particles are cooled with water, via indirect heat exchange, before entering the regenerator, while U.S. Pat. No. 4,917,790 employs a water cooled heat exchanger in the stripper to cool the catalyst. Other schemes use the incoming oil feed as a cooling medium, so that the heat is not lost to the system. For example, U.S. Pat. No. 4,960,503 discloses using a backmix heat exchanger located in a separate vessel external of the regenerator as a catalyst cooler. Hot regenerated catalyst particles are withdrawn from the regenerator, passed outside into the cooler in which they are cooled by heating the FCC feed oil, and then passed back into the regenerator. Fluidizing gas must also be used in the heat exchanger, both as a cooling medium to regulate the shell-side temperature of the heat exchange surface, and to enable catalyst circulation back into the regenerator. British patent publication 2,100,747 discloses passing the oil feed through tubes located within the hot catalyst bed inside the regenerator to control the regenerator temperature. However, a serious debit incurred with using hot, catalyst particles from the regenerator to heat the FCC feed is coke formation in the feed and on the heat exchange surfaces. This degrades the feed and reduces the amount of heat exchange.

SUMMARY OF THE INVENTION

The present invention relates to a fluid catalytic cracking (FCC) process in which the incoming feed is preheated, in indirect heat exchange, with spent and stripped cracking catalyst before it is contacted with the hot, regenerated cracking catalyst. This reduces both the temperature of the catalyst in the regenerator and the temperature differential between the hot, regenerated cracking catalyst and the cooler oil feed being fed into the cracking zone, while maintaining the heat balance in the system. It also reduces the external heat required to heat the feed to the desired temperature. Reducing the regenerator temperature also reduces catalyst deactivation due to vanadium and nickel poisoning. Decreasing the temperature differential between the hot, regenerated catalyst and the feed being fed into the cracking zone in the riser in which it contacts the hot catalyst, produces more uniform cracking of the feed with less coke make and more uniform cracked product distribution. Using the spent and stripped catalyst for the feed preheat instead of the hotter, regenerated catalyst as disclosed in the prior art also reduces coking and fouling of heat exchanger surfaces in contact with the feed being heated. Basically the invention relates to an FCC process in which a hydrocarbon feed is contacted with a fluidized, particulate, hot cracking catalyst in a cracking zone at conditions effective to crack said feed into lower boiling hydrocarbons, which are recovered, and to form spent catalyst particles containing coke and strippable hydrocarbons; followed by stripping said strippable hydrocarbons from said spent catalyst; passing at least a portion of said stripped catalyst particles through a heat exchanger and then into a regenerator in which said particles are contacted with a gas comprising oxygen to burn off said coke and form a regenerated catalyst which is passed back into said cracking zone to contact and crack said hydrocarbon feed, wherein said stripped particles passing through said heat exchanger heat at least a portion of said feed in indirect heat exchange relationship. Cracking catalysts useful in the process of the invention include the well known zeolite containing cracking catalysts.

It is preferred that the heat exchange between the stripped catalyst and the incoming hydrocarbon feed be sufficient to maintain the temperature in the catalyst regenerator at a temperature of no more than about 1150° F. (621° C.). It has been found that operating the regenerator under these temperature conditions reduces catalyst deactivation and permits the amount of vanadium on the catalyst to be doubled, compared to a more conventional and higher regenerating temperature of, i.e., 1365° F. (741° C.), with no loss of catalyst cracking activity. The temperature in the regenerator is controlled by the amount of heat transferred to the hydrocarbon feed by the stripped catalyst being passed through the heat exchanger from the stripper to the regenerator. The lower temperature of the regenerated catalyst returning to the riser cracking zone in which it contacts the feed, is compensated by the rise in the temperature of the feed as a consequence of the heat exchange. The process of the invention avoids the heat loss to the FCC unit associated with using water for catalyst cooling. In addition to a reduction in vanadium catalyst deactivation achieved by the invention, the lower temperature of the catalyst passing from the regenerator to the cat cracking zone at the feed injection point where the regenerated catalyst contacts the hot feed, reduces the amount of gas and coke produced by thermal cracking. Further, since the catalyst temperature is lower and the hydrocarbon feed temperature higher, the temperature in the cracking zone is more uniform. In some cases, the lower temperature in the catalyst regenerator will decrease the combustion rate of the carbon or coke present on the spent catalyst to carbon oxides. Therefore, in one embodiment of the invention two stage catalyst regeneration is employed to increase the regeneration efficiency and insure sufficient carbon burn-off on the catalyst. In a further embodiment, catalyst regeneration is accomplished under partial burn or net reducing conditions by limiting the amount of oxygen or air used for the coke burn-off. This reduces the air or oxygen requirements of the regeneration and assists in the heat balance of the FCC due to the reduced amount of heat produced by the regeneration. By reducing conditions is meant that at least 1 volume % carbon monoxide is present in the flue gas produced in the regenerator by burning the coke off the spent catalyst. Reducing conditions also passivate nickel which might be present on the catalyst. This compensates for higher amounts of nickel introduced with larger amounts of heavy feed components in the FCC feed. Thus, the process of the invention is effective with heavy feeds which contain one or both of vanadium and nickel, including resids and other natural and synthetic feeds which contain asphaltenes and other heteroatoms and materials which contain catalyst deactivating metals, such as vanadium and nickel, orders of magnitude higher than lighter free distillate feeds, such as gas oils. In one embodiment of the process of the invention, the FCC feed will comprise a mixture of a gas oil with one or more of such heavy feed components.

The process of the invention increases the useful life of a zeolite-containing cracking catalyst in an FCC process and permits the use of a feed with increased amounts of vanadium, with no loss of catalyst activity, while maintaining heat conservation in the FCC unit and without incurring the debits of prior art processes mentioned above. In one embodiment the invention relates to a fluid catalytic cracking process for producing lighter boiling products from a hydrocarbonaceous or hydrocarbon feed which comprises the steps of:

(a) contacting said feed with a particulate, hot, regenerated cracking catalyst in a catalyst cracking reaction zone at conditions effective to catalytically crack said feed and produce lower boiling hydrocarbons and coked catalyst particles which contain strippable hydrocarbons;

(b) separating said lower boiling hydrocarbons from said coked catalyst particles which contain said strippable hydrocarbons;

(c) passing said coked catalyst particles which contain said strippable hydrocarbons into a stripping zone and stripping said strippable hydrocarbons from said coked catalyst particles to produced stripped, coked catalyst particles;

(d) passing said stripped, coked catalyst particles from said stripping zone into a catalyst regenerating zone, with at least a portion of said particles also passing through a heat exchange zone located between said stripping and regenerating zones, in which at least a portion of said feed is heated by said stripped, coked catalyst particles in indirect heat exchange relationship, prior to being passed into said catalytic cracking zone;

(e) passing a gas comprising oxygen into said regenerating zone which operates at conditions effective for oxygen to oxidize said coke and regenerate said catalyst particles, and (f) passing said regenerated catalyst particles into said catalytic cracking zone. The heat exchange is accomplished by suitable heat exchange means located proximate or within the means or conduit by which the stripped spent catalyst is passed from the stripping zone to the regenerating zone. Further embodiments include using multiple stage catalyst regeneration, operating the regenerator under reducing conditions under which at least 1 volume % carbon monoxide is present in the regenerator flue gas, and maintaining the temperature in the regenerator below about 1150° F.

DETAILED DESCRIPTION OF THE INVENTION

Figure 1:
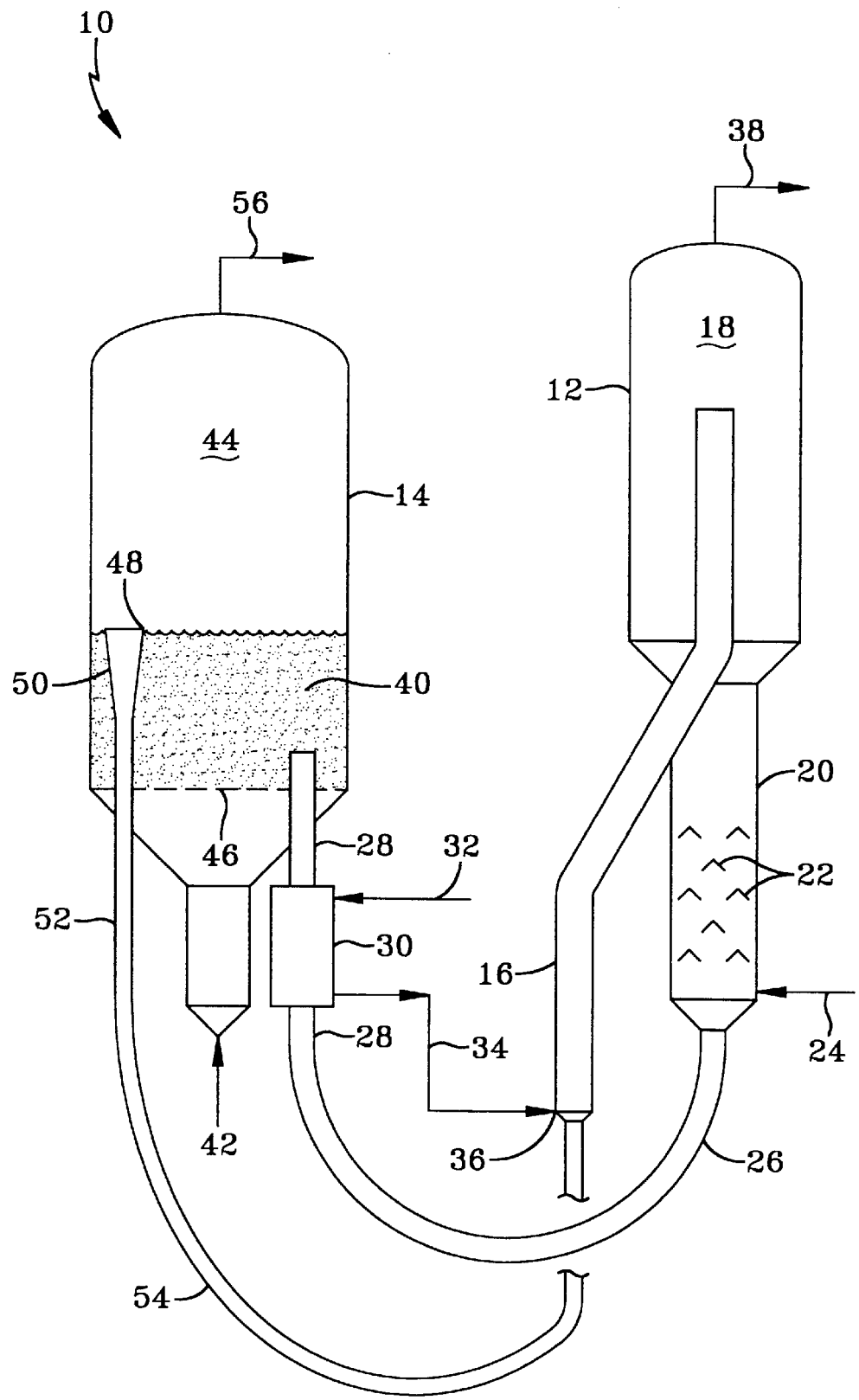
FIG. 1 schematically illustrates, in partial cut-away fashion, a FCCU useful in the process of the invention employing single stage catalyst regeneration.

The process of the invention is useful for increasing catalyst life when processing any feed which contains vanadium and permits the use of more vanadium containing components in the feed without effecting the heat balance and conservation in the FCC unit and without decreasing the catalyst activity and life from vanadium poisoning. Alternately, it increases the catalyst life due to vanadium poisoning. Vanadium is present in heavy feeds which typically boil above about 950° F. (500° C.), by which is meant any feed which contains metals and coke precursors such as asphaltenes, maltenes, asphalts or bitumens, and other polynuclear aromatic and heteroatom compounds and the like. Heavy feeds which normally contain vanadium and which are useful in the process of the invention include any conventionally known heavy hydrocarbonaceous materials including whole and reduced crudes, resids or residua from atmospheric and vacuum distillation of crude oil, asphalts and asphaltenes, tar oils and cycle oils from thermal or catalytic cracking of heavy petroleum oils, tar sand oil, shale oil, coal derived liquids, syncrudes and the like. These materials typically contain from about 1–25 wt. % asphaltenes, 5–30 wt. % residual or Conradson carbon materials and 2–2000 ppm of vanadium, along with iron, nickel, sodium, other metals and sulfur and nitrogen containing components. In practicing the process of the invention, these heavy hydrocarbonaceous materials are mixed or blended with the cat cracker feed. Cat cracker feeds typically include gas oils which are high boiling, nonresidual oils such as a vacuum gal oil (VGO), a straight run (atmospheric) gas oil, a light cat cracker oil (LCGO) and coker gas oils. These oils have an initial boiling point typically above about 450° F. (232° C.), with end points up to about 1150° F. (620° C.) and more commonly above about 662° F. (350° C.), as well as straight run or atmospheric gas oils and coker gas oils. While these feeds normally contain catalyst deactivating metals such as vanadium, the metals level in typical cat cracker feeds is very minor compared to that present in the heavy feeds. The vanadium containing heavy feed component is typically present in the FCC feed in an amount broadly ranging from about 2 to 50 volume % of the blend, and more generally from about 5–30 volume %. Cracking catalysts useful in the practice of the invention preferably comprise a cracking catalyst having a zeolitic component, such as one or more porous inorganic oxides containing from about 1–60 wt. %, preferably from 1–40 wt. % and still more preferably from about 5–40 wt. % of the zeolite component based on the total catalyst weight. Porous inorganic matrices include alumina, silicaalumina, silicamagnesia, silica-thoria, silica-zirconia, silica-beryllia, silica titania as well as temery inorganic oxide compositions such as silica-alumina-thoria, silicaalumina-zirconia, silica-alumina-magnesia and the like. Typical cat cracking conditions in the process of the invention include a temperature of from about 800°–1150° F. (425°–621° C.), preferably 842°–1150° F. (450–621 ° C.) and still more preferably 900°–1150°F. (480°–560° C.), a pressure between about 5–60 psig, preferably 5–40 psig with feed/catalyst contact times between about 0.5–15 seconds, preferably about 1–6 seconds, and with a catalyst to feed ratio of of about 0.5–10 and preferably 2–8. The feed is preheated to a temperature of not more than 800° F., preferably no greater than 750° F. and typically within the range of from about 600°–725° F. Some of the feed preheat will come from a heat exchanger upstream of the heat exchanger in which the stripped catalyst particles heat at least a portion of the feed. This upstream heat input is reduced in the practice of the invention, by the heat supplied by the stripped particles. The temperature in the regenerating zone is controlled by adjusting the amount of feed and/or stripped catalyst particles passing through the indirect heat exchanger between the stripping zone and the regenerating zone and also by the number of stages in, and the extent of maintaining oxidative or reducing conditions in, the regenerating zone or regenerator.

Turning to FIG. 1, an FCC unit 10 useful in the practice of the invention is shown as a Flexicracker® (Flexicracker is a registered trademark of Exxon) comprising a reactor unit 12 and a regeneration unit 14. Cracking unit 12 includes a feed riser 16 which comprises the reaction zone, a disengaging zone 18 and a stripping zone 20 containing a plurality of baffles 22 within, in the form of arrays of metal "sheds" which resemble the pitched roofs of houses. A suitable stripping agent such as steam is introduced into the stripping zone via line 24. The stripped, spent catalyst particles are fed into regenerating unit 14 via transfer line 26, riser 28 and heat exchanger 30 which is located along the riser 28, into the regenerator. At least a portion of the hot catalyst particles pass through the feed heat exchanger 30 to heat the incoming FCC feed. Heat exchanger 30 is an indirect heat exchanger which heats the feed by means of the hot catalyst particles being fed into the regenerator via riser 28. In operation, at least a portion of the cat cracking feed is fed from feed line 32 into heat exchanger 30 which preheats the feed by means of the stripped, hot, spent catalyst particles being recycled from the stripping zone 20 of cracking unit 12 into regenerator 14. The preheated feed exits the heat exchanger and is passed fed via line 34 into the base of riser 16 at feed injection point 36 of the fluidized cat cracking reactor unit 12. The feed comprises a mixture of a vacuum gas oil (VGO) and a heavy feed component, such as a vanadium and nickel containing resid fraction. The hot feed is contacted with particles of hot, regenerated cracking catalyst in the riser. This vaporizes and catalytically cracks the feed into lighter, lower boiling fractions, including fractions in the gasoline boiling range (typically 100°–400° F.). The cracking catalyst is a mixture of silica and alumina containing a zeolite molecular sieve cracking component, as is known to those skilled in the art. The catalytic cracking reactions start when the feed contacts the hot catalyst in the riser at feed injection point 36 and continues until the product vapors are separated from the spent catalyst in the upper or disengaging section 18 of the cat cracker. The cracking reaction deposits the metals, such as vanadium and nickel, present in the feed onto the fine catalyst particles, along with strippable hydrocarbonaceous material and non-strippable carbonaceous material known as coke, to produce spent catalyst particles which must be stripped to remove and recover the strippable hydrocarbons and then regenerated by burning off the coke in the regenerator. Reactor 12 contains cyclones (not shown) in the disengaging section 18 which separate both the cracked hydrocarbon product vapors and the stripped hydrocarbons (as vapors) from the spent catalyst particles. The hydrocarbon vapors pass up through the reactor and are withdrawn via line 38. The hydrocarbon vapors are typically fed into a condenser (not shown) and then to a distillation unit or column (not shown) which condenses the condensable portion of the vapors into liquids and fractionates the liquids into separate product streams.

The spent catalyst particles fall down into stripping zone 20 in which they are contacted with a stripping medium, such as steam, which is fed into the stripping zone via line 24 and removes, as vapors, the hydrocarbonaceous material deposited on the catalyst during the cracking reactions. These vapors are withdrawn along with the other product vapors via line 38. The baffles 22 disperse the catalyst particles uniformly across the width of the of the stripping zone or stripper and minimize internal refluxing or backmixing of catalyst particles in the stripping zone. The spent, stripped catalyst particles are removed from the bottom of the stripping zone via transfer line 26 from which they are passed into riser 28 and into regenerator 14, with at least a portion passing through heat exchanger 30 located along riser 28. In the embodiment shown, the heat exchanger is integral with the riser 28. However, other embodiments may be used in which the heat exchanger is external of the riser and a side stream of catalyst is passed therethrough. The heat exchanger is an indirect heat exchanger in which the hot catalyst particles do not come into direct contact with the feed and contains heat exchange surface and means for the feed and catalyst particles to pass through in indirect heat exchange relationship. The spent catalyst particles exit riser 28 and pass into fluidized bed 40 in which they are contacted with air entering the regenerator via line 42 and some pass up into disengaging zone 44 of the regenerator. The air oxidizes or burns off the carbon deposits to regenerate the catalyst particles and in so doing, heats them up to a temperature which preferably doesn't exceed about 1150° F. and which, in the practice of the invention, will typically range from about 950°–1150° F., preferably from 950°–1125° F., instead of the 1100°–1400° F. (590°–760° C.) range typical of the prior art. Operating the regenerator at a temperature no greater than about 1150° F. permits the amount of vanadium containing resid or other vanadium containing heavy feed material to be present in the feed in an amount double the amount that it could contain at the higher temperature of 1365° F., or permits an increase in the amount of heavy feed component in the FCC feed, with no reduction in catalyst activity due to vanadium poisoning. Alternately, if the vanadium containing feed components are used at the normal level, catalyst life is twice what it would be at the higher temperature and this means that the catalyst make-up to the system will be about half the rate it would be at the higher temperature. Regenerator 14 also contains cyclones (not shown) which separate the hot regenerated catalyst particles from the gaseous combustion products which comprise mostly $CO_2$ and feeds the regenerated catalyst particles back down into fluidized catalyst bed 40 by means of diplegs (not shown) as is known to those skilled in the art. The fluidized bed 40 is supported on a gas distributor grid, which is briefly illustrated as dashed line 46. The hot, regenerated catalyst particles in the fluidized bed overflow the weir 48 formed by the top of a funnel 50, which is connected at its bottom to the top of a downcomer 52. The bottom of downcomer 52 turns into a regenerated catalyst transfer line 54. The overflowing, regenerated particles flow down through the funnel, downcomer and into the transfer line 54 which passes them back into the riser reaction zone 16, in which they contact the hot feed entering the riser from line 34. Flue gas comprising mostly $CO_2$ is removed from the top of the regenerator via line 56. In the embodiment in which the regenerator is operated under reducing conditions, the flue gas will comprise at least about 1 volume % CO.

Figure 2:
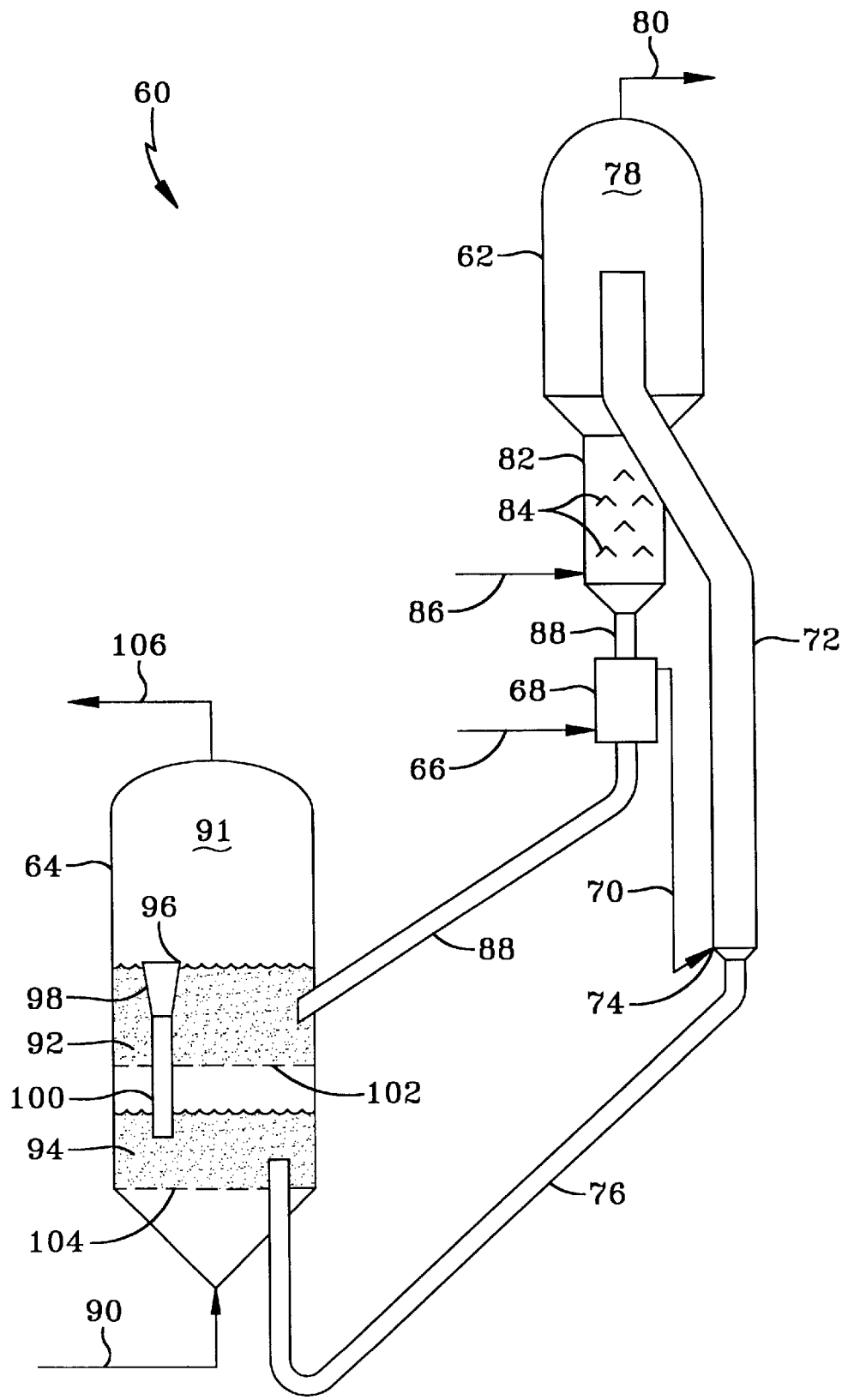
FIG. 2 is a partially cut-away schematic illustration of a FCCU useful in the process of the invention which employs two stage catalyst regeneration.

An FCC unit with a two stage catalyst regeneration zone useful in the practice of the invention is shown in FIG. 2. Except for the two stage regeneration zone, this unit is substantially the same as that of FIG. 1. Thus, FCC unit 60 comprises a reactor vessel 62 and a two stage regenerator 64. A vanadium containing FCC feed comprising a mixture of a gas oil and a heavy feed component, such as a residuum, is passed via line 66 into heat exchanger 68 and the hot feed exits the heat exchanger and is passed, via line 70, into riser reactor 72 at feed injection point 74. In riser 72 the hot feed contacts hot, regenerated catalyst particles (not shown) entering the riser from regenerator 64 via transfer line 76 and is catalytically cracked into lower boiling hydrocarbon products which are present as vapors. During the cracking reaction, vanadium and other metals (such as nickel) present in the feed are deposited on the catalyst particles, along with coke and strippable hydrocarbonaceous material, to form spent catalyst. The vapors and fluidized catalyst particles enter the reactor vessel 62 in disengaging zone 78 in which cyclone separators (not shown) separate the product vapors from the catalyst particles, with the vapors being removed overhead via line 80 and diplegs on the cyclones (not shown) passing the spent catalyst particles down into stripping zone 84 in which they are contacted with a stripping medium, typically steam, fed into the bottom of the stripper via line 86, which removes the strippable hydrocarbons from the catalyst particles. The steam and stripped hydrocarbons exit the top of the reactor via line 80, along with the other vapors. Baffles 84 in the stripper function the same as in the stripper of FIG. 1. The stripped, spent catalyst particles which contain the deposited metals and coke, are transferred to the regenerator 64 via transfer line 88. Air entering the bottom of the regenerator via line 90 burns the coke off the catalyst particles, thereby regenerating them. In regenerator 64 the spent catalyst passes into a first fluidized catalyst bed 92 in which it contacts the uprising air which is diluted by the combustion products ($CO_2$ and CO) from burning coke off the catalyst particles in the second, lower bed, 94. In bed 92, the regenerated catalyst particles overflow the top of a weir 96 formed by the open top of funnel 98, with downcomer 100 extending from the bottom thereof into the second and lower catalyst bed 94. Catalyst beds 92 and 94 are supported by respective gas injection grids 102 and 104. The downflowing catalyst passes through the funnel and downcomer and into the second fluidized bed of catalyst 94, in which further combustion of the coke takes place. Cyclone separators (not shown) located in the top of the disengaging zone in the regenerator, separate the regenerated catalyst particles from the gaseous combustion products (which comprise mainly $CO_2$) which are removed overhead as flue gas via line 106. Diplegs extending down from the cyclones (not shown) return the regenerated catalyst particles to bed 98. In lower bed 94, the catalyst particles contact less diluted air and further combustion occurs, to produce fully regenerated catalyst particles. These are withdrawn from bed 94 and passed to riser reactor 72, via transfer line 76, in which they contact the hot feed. In the embodiment in which the regenerator is run under reducing conditions, the flue gas which exits the regenerator via line 106, will contain at least 1 volume % CO.

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

What is claimed is:

1. A fluid catalytic cracking process for producing lighter boiling products from a hydrocarbon feed which comprises the steps of:

(a) contacting said feed with a particulate, hot, regenerated cracking catalyst in a catalyst cracking reaction zone at conditions effective to catalytically crack said feed and produce lower boiling hydrocarbons and coked catalyst particles which contain strippable hydrocarbons;

(b) separating said lower boiling hydrocarbons from said coked catalyst particles which contain said strippable hydrocarbons;

(c) passing said coked catalyst particles which contain said strippable hydrocarbons into a stripping zone and stripping said strippable hydrocarbons from said coked catalyst particles to produced stripped, coked catalyst particles;

(d) passing said stripped, coked catalyst particles from said stripping zone into a catalyst regenerating zone, with at least a portion of said particles also passing through a heat exchange zone located between said stripping and regenerating zones, in which at least a portion of said feed is heated by said stripped, coked catalyst particles in indirect heat exchange relationship prior to being passed into said catalytic cracking zone;

(e) passing a gas comprising oxygen into said regenerating zone which operates at conditions effective for oxygen to oxidize said coke and regenerate said catalyst particles, and (f) passing said regenerated catalyst particles into said catalytic cracking zone.

2. A process according to claim 1 wherein said feed contains vanadium.

3. A process according to claim 2 wherein the temperature of said regenerated catalyst passed into said catalytic cracking zone does not exceed about 1150° F.

4. A process according to claim 3 wherein said feed includes a heavy feed component.

5. A process according to claim 4 wherein said catalyst regeneration is achieved in two steps.

6. A process according to claim 3 wherein said regenerating zone is operated under reducing conditions.

7. A process according to claim 6 wherein said regeneration produces a flue gas containing at least about 1 volume percent carbon monoxide.

8. A process according to claim 3 wherein said feed contains a heavy feed component and vanadium.

9. A process according to claim 8 wherein said feed also contains nickel.

10. A process according to claim 9 wherein said nickel is deposited on said catalyst during said catalytic cracking and wherein said nickel on said catalyst is passivated in said regenerating zone.

11. A process according to claim 3 wherein said regenerated catalyst temperature is obtained by a combination of (i) the amount of said heat exchange between said feed and stripped, coked particles, (ii) the temperature of said feed entering said heat exchange zone and (iii) said regenerating conditions.

* * * * *